United States Patent
Kuwako et al.

[11] 3,906,264
[45] Sept. 16, 1975

[54] ROTOR VIBRATION SUPPRESSING APPARATUS FOR MINIATURE ELECTRIC MOTORS

[75] Inventors: Tomohisa Kuwako, Anjo; Tosio Tanase, Motosu, both of Japan

[73] Assignee: Kabushiki Kaisha Tokai Rika Denki Seisakusho, Japan

[22] Filed: Nov. 7, 1973

[21] Appl. No.: 408,124

[30] Foreign Application Priority Data
Oct. 20, 1972 Japan............ 47-120609[U]

[52] U.S. Cl................... 310/51; 310/162
[51] Int. Cl.² ........................ H02K 5/24
[58] Field of Search ........ 310/49, 51, 266, 40 MM, 310/154, 162–164; 74/574

[56] References Cited
UNITED STATES PATENTS

| | | | |
|---|---|---|---|
| 2,548,633 | 4/1951 | Stephenson | 310/164 |
| 3,197,659 | 7/1965 | Marshall | 310/49 |
| 3,204,137 | 8/1965 | Gardes | 310/164 |
| 3,234,417 | 2/1966 | Somers | 310/40 MM |
| 3,333,129 | 7/1967 | Kohlhagen | 310/164 |
| 3,359,439 | 12/1967 | Fujimoto | 310/164 |
| 3,469,133 | 9/1969 | Stcherbatcheff | 310/164 |
| 3,521,097 | 7/1970 | Trinter | 310/162 |
| 3,549,923 | 12/1970 | Kurakin | 310/162 |
| 3,614,495 | 10/1971 | Suzuki | 310/162 |
| 3,678,311 | 7/1972 | Mattingly | 310/164 |
| 3,720,852 | 3/1973 | Vieweg | 310/40 MM |

Primary Examiner—R. Skudy
Attorney, Agent, or Firm—Woodhams, Blanchard and Flynn

[57] ABSTRACT

A rotor vibration suppressing apparatus for a miniature electric motor in which a compression coil spring is arranged peripherally on a rotor shaft and a hard member is fitted in a bearing. Said compression coil spring is adapted to press a rotor towards said bearing for keeping said rotor in a definite position and said hard member is adapted to support said rotor shaft to rotate the same smoothly so that the vibration of said rotor can be suppressed and the generation of the vibrational sound can be prevented.

5 Claims, 4 Drawing Figures

3,906,264

ROTOR VIBRATION SUPPRESSING APPARATUS FOR MINIATURE ELECTRIC MOTORS

This invention relates to a rotor vibration suppressing apparatus for a miniature electric motor, especially for a miniature AC motor, which is designed so as to suppress the vibration of rotor caused by the excitation.

In conventional types of miniature AC motors, especially in such a type of motor that a rotor is excited through energization of exciting coil and is rotated by the magnetic attraction and repulsion generated between the same and a magnet, when the rotor is rotated by the excitation, an axial vibration is generated in said rotor, and thereby there is caused a shortcoming such as the generation of vibrational sound between a rotor shaft to which said rotor is fastened and a bearing member.

In this invention, it was intended to eliminate the abovementioned shortcoming.

An object of this invention is to provide a rotor vibration suppressing apparatus for a miniature electric motor which is capable of suppressing the axial vibration of rotor caused by the excitation or rotation of said rotor and accordingly preventing the generation of vibrational sound caused thereby.

Another object of this invention is to provide a rotor vibration suppressing apparatus for a miniature electric motor which is capable of suppressing the vibrations by such simple means that motors of good quality as well as of low price can be manufactured.

Essentially, according to the present invention, there is provided a rotor vibration suppressing apparatus for a miniature electric motor consisting essentially of a rotor shaft supported by bearings in a casing, a rotor fastened to said rotor shaft, and a compression coil spring arranged peripherally on said rotor shaft and interposed between one of the bearings and said rotor, thereby suppressing the axial vibration of said rotor.

Other objects, features and advantages of this invention will become apparent from the following description taken in connection with the accompanying drawings in which.

Figure 1:
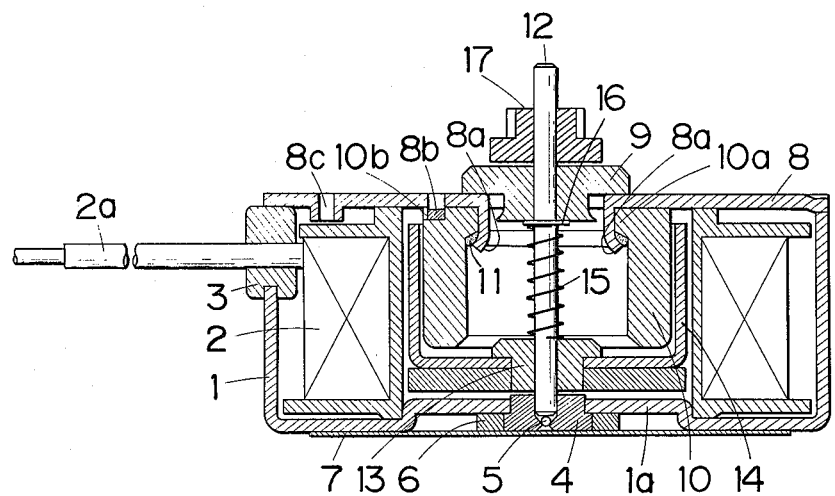
FIG. 1 is a central longitudinal sectional view of an electric motor.
Figure 2:
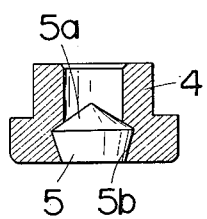
FIG. 2 is a central longitudinal sectional view of another form of bearing parts.
Figure 3:
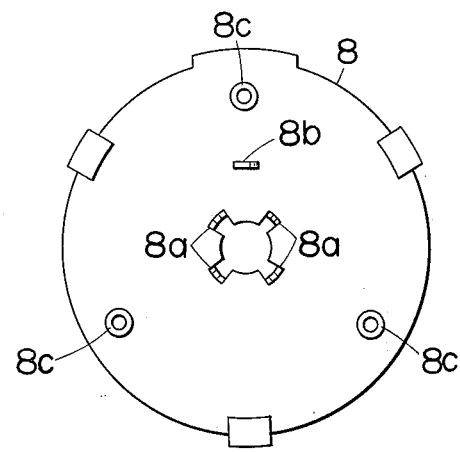
FIG. 3 is a back view of a back cover.
Figure 4:
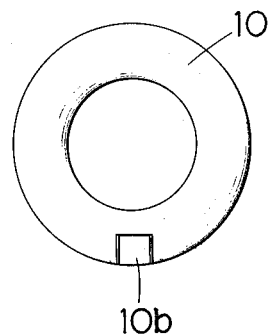
FIG. 4 is a bottom view of a cylindrical magnet.

Referring now to the drawings, there is illustrated one embodiment of the present invention. Reference numeral 1 represents a motor casing and 2 is an annular coil fastened to the inside of said casing 1. A lead wire 2a is led to the outside through the hollow space of an isolator 3 made of, for example, rubber, and fitted on the periphery of said casing 1. 4 is an oilless bearing, for example a sintered copper oilless bearing, fixed in the center of a concave portion 1a in said casing 1, and in a hole of said bearing is fitted a spherical hard member 5 made of, for example, steel, polyacetal resin, or the like. FIG. 2 illustrates another example of oilless bearing 4, in which the hard member 5 has its head 5a formed conical and the other end formed trapezoidal 5b. Said hard member 5 is fitted in said oilless bearing 4 by means of said trapezoidal portion 5b. 6 is an oil-impregnated felt piece arranged to contact with the outside periphery of said oilless bearing 4. 7 is a name plate stuck on said casing 1 so as to cover the concave portion 1a of said casing 1 and thereby to prevent the oil contained in said felt piece 6 from leaking out. Numeral 8 is a back cover fastened to the opening side of the casing 1, and a bearing 9 is fixed to a central hole of said back cover 8. A plurality of inwardly bent pieces 8a are formed on the rim of the central hole of the back cover 8 coaxially therewith, and, further, a projection 8b is embossed on said back cover. 8c are tapped holes for mounting the motor to a machinery as desired. 10 is a cylindrical magnet having an annular projection 10a formed on its lower inside portion and a notch 10b at a certain place on its lower surface. Said annular projection 10a of the cylindrical magnet 10 has such an inner diameter that the abovementioned bent pieces 8a are just fitted thereto. Thus, said annular projection 10a of the cylindrical magnet is fitted to the bent pieces 8a of the back cover 8, and the notch 10b on the lower surface of the magnet is simultaneously fitted to the projection 8b. Then, the upper surface of said annular projection 10a is secured by bending said pieces 8a thereto, through an elastic ring member 11 made of, for instance, rubber, interposed therebetween. 12 is a rotor shaft carried by the abovementioned oilless bearing 4 and bearing 9. A boss 13 is fastened to said rotor shaft 12, and a rotor 14 is fastened to said boss 13. 15 is a compression coil spring provided on the abovementioned rotor shaft 12 for suppressing the vibration of the rotor 14. 16 is a plan washer interposed between said compression coil spring 15 and the bearing 9. In addition, a gear 17 is fastened to the top end of the rotor shaft 12.

In operation, when an AC voltage is applied to the lead wire 2a, a force of rotation synchronized with the frequency of the AC power source is generated in the rotor 14 of the motor due to the construction of the magnetic circuit. For further understanding of the above operation, it is to be referred to the U.S. Pat. No. 3,348,083.

When said rotor 14 rotates, an axial vibration is generated in the rotor shaft 12 and thereby there is caused a peculiar vibrational sound about the portion contacting with the bearing, that is the portion between the rotor shaft 12 and the hard member 5 of the oilless bearing 4. In this embodiment, however, the rotor shaft 12 which carries the rotor 14 is provided with the compression coil spring 15 for pressing the rotor shaft 12 with a slight pressure towards only one side, and the rotor shaft 12 is carried by the hard member 5, so that the axial position of the rotor 14 is kept definitely and, notwithstanding the rotation of rotor, the vibrational sound as well as the vibration can be prevented.

According to this embodiment, in which the oilless bearing 4 is used as a bearing member and said bearing 4 is fitted with the hard member 5, the motor construction may be extremely simple and the rotor shaft 12 can be borne smoothly, thus preventing the generation of vibrational sound.

Moreover, according to this embodiment, the annular projection 10a is formed on the lower inside portion of the cylindrical magnet 10, and the bent pieces 8a are formed on the back cover 8 so as to substantially correspond with the inner diameter of said annular projection 10a, whereby the cylindrical magnet 10 is fixed by said bent pieces. Therefore, the fixation of the cylindrical magnet 10 can be carried out easily and rapidly, and the positioning thereof is also possible by means of the bent pieces 8a.

As mentioned above, in the present invention, the compression coil spring is interposed between one of bearings and the rotor, so that the rotor shaft is pressed towards only one side with a slight pressure and is supported by the hard member fitted in the bearing hole. Therefore, the axial position of the rotor is kept definitely and the axial vibration thereof is suppressed. Thus, the present invention has the effect not only of suppressing the vibrational sound due to the rotation and thereby attaining a quiet rotation, but also of simplifying the construction owing to the absence of additional member except the compression coil spring.

What is claimed is:

1. An electric motor having a rotor vibration-suppressing apparatus, comprising; a motor casing; an annular coil fixed in the casing and adapted for connection to a source of A.C. potential; an annular magnet fixed in said casing and being opposed to and spaced from said coil; a rotor having a portion disposed in the space between said coil and said magnet so that said rotor is rotated in synchronism with the frequency of the A.C. potential source when said coil is energized; a rotatable shaft concentric with said magnet, said rotor being fixed to said shaft for conjoint rotation therewith; first and second axially spaced bearings fixed in said casing and rotatably supporting said shaft; a compression coil spring surrounding said shaft and located between said bearings, said coil spring bearing at one end thereof against one of said bearings and bearing at the other end thereof against said rotor to continuously urge said shaft axially toward the other bearing, said other bearing having a central opening into which is received one end portion of said shaft, a member of hard material disposed in said opening and contacting the end wall of said one portion of said shaft, said compression coil spring continuously pressing said end wall against said member whereby said shaft is continuously supported by said member, thereby suppressing axial vibration of said shaft and said rotor and minimizing generation of vibration sound.

2. An electric motor according to claim 1, in which said member is a spherical member fitted into said opening.

3. An electric motor according to claim 1, in which said member comprises a trapezoidal portion fitted into said opening and a conical portion whose tip is centrally located in said opening and contacts said end wall of said shaft.

4. An electric motor having a rotor vibration-suppressing apparatus, comprising; a motor casing; an annular coil fixed in the casing and adapted for connection to a source of A.C. potential; an annular magnet fixed in said casing and being concentric with, disposed within, radially spaced from and opposed to the radially inner side of said coil; a rotor having an annular portion concentric with said coil and disposed in the space between the radially inner side of said coil and the periphery of said magnet so that said rotor is rotated in synchronism with the frequency of the A.C. potential source when said coil is energized; a rotatable shaft concentric with said magnet, said rotor being fixed to said shaft for conjoint rotation therewith; first and second axially spaced bearings fixed in said casing and rotatably supporting said shaft; a compression coil spring surrounding said shaft and located between said bearings, said coil spring bearing at one end thereof against one of said bearings and bearing at the other end thereof against said rotor to continuously urge said shaft axially against the other bearing, thereby suppressing axial vibration of said shaft and said rotor, said casing having a cover closing one end of said casing and disposed over corresponding ends of said coil and said magnet, said cover having said one bearing mounted therein and also having inwardly bent pieces underlying and supporting said magnet, said magnet having a notch on one end thereof and said cover having a projection extending into said notch, whereby said magnet is supported on said cover.

5. An electric motor having a rotor-vibration suppressing apparatus, comprising; a motor casing; an annular coil fixed in the casing and adapted for connection to a source of A.C. potential; an annular magnet fixed in said casing and being concentric with, disposed within, radially spaced from and opposed to the radially inner side of said coil; a generally cup-shaped rotor comprising a base wall and an annular portion concentric with said coil and disposed in the space between the radially inner side of said coil and the periphery of said magnet so that said rotor is rotated in synchronism with the frequency of the A.C. potential source when said coil is energized; a rotatable shaft concentric with said magnet, said rotor being fixed to said shaft for conjoint rotation therewith; said base wall of said rotor extending transverse to said shaft and being disposed adjacent to one axial end of said magnet, said base wall having a central opening therethrough; a boss fixed to said shaft and said base wall and extending through said central opening in said base wall; first and second axially spaced bearings fixed in said casing and rotatably supporting said shaft; a compression coil spring surrounding said shaft and located between said bearings, said coil spring bearing at one end thereof against one of said bearings and bearing at the other end thereof against said boss too continuously urge said shaft axially against the other bearing, said shaft extending through said boss into said other bearing, one axial end of said spring bearing against said boss and said spring extending axially through the central opening of said magnet and its other axial end bears against said one bearing adjacent to the opposite axial end of said magnet, thereby suppressing axial vibration of said shaft and said rotor.

* * * * *